May 27, 1969   D. B. EMERY ET AL   3,446,890
METHOD OF DEFLASHING AND POLISHING MOLDED PLASTIC ARTICLES
Filed Sept. 29, 1965
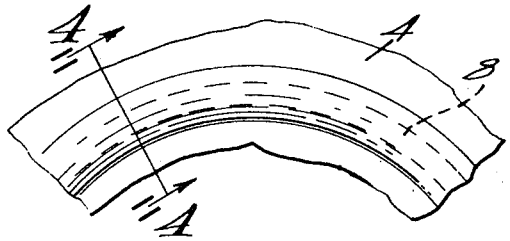
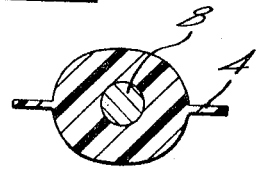
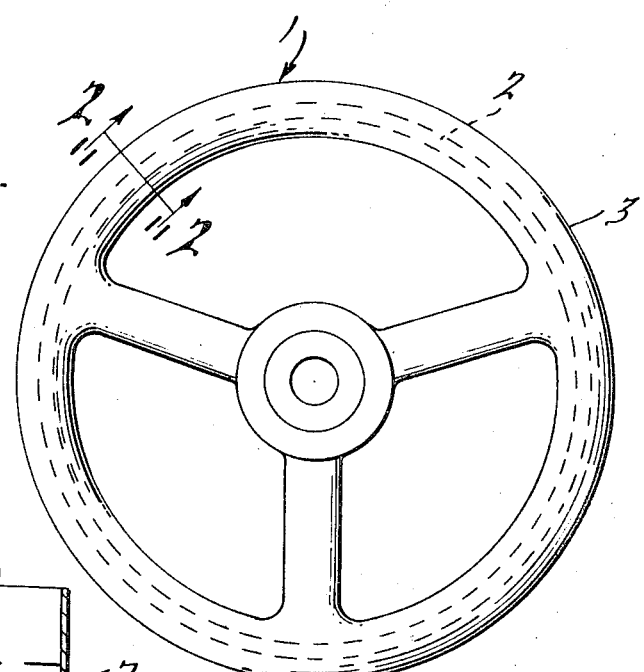
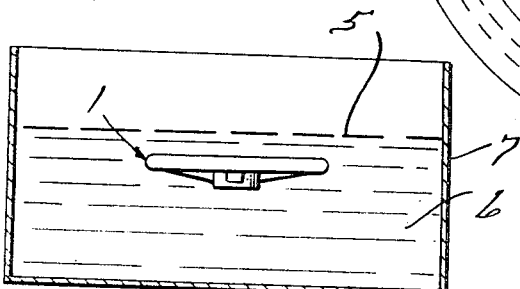
INVENTORS.
Donald B. Emery.
BY James A. Miller
ATTORNEYS

United States Patent Office 3,446,890
Patented May 27, 1969

3,446,890
METHOD OF DEFLASHING AND POLISHING MOLDED PLASTIC ARTICLES
Donald B. Emery, Grosse Pointe Park, and James A. Miller, Southfield, Mich., assignors, by mesne assignments, to Sheller-Globe Corporation, a corporation of Ohio
Filed Sept. 29, 1965, Ser. No. 491,334
Int. Cl. B29c 25/00
U.S. Cl. 264—341                                      6 Claims This invention relates to deflashing and polishing of molded plastic articles by a method of immersion in a liquid solvent bath. More particularly, the invention relates to a method for the deflashing and polishing of either the propionate or butyrate type molded plastic steering wheels with a liquid solvent bath.

When molded plastic articles are made by normal molding technique, there is always a certain amount of mold flash left over on the edge of the articles resulting from the formation of mold flash at the mold parting line, that is, the point at which the two mold halves come together. In the past, removal of this mold flash from molded plastc articles has been difficult, time consuming and expensive. This deflashing in the past has usually been carried out manually with knives or other cutters in an individual operation.

It has also been known that to avoid manual removal of the mold flash, the prior art has suggested its removal by contacting the molded plastic articles with a vaporized solvent. This technique is disclosed in United States Patent 3,020,661. Although the vaporized solvent method is successful in removing mold flash from molded plastic articles, it also has considerable disadvantages which make it undesirable from many standpoints in present day technology. For example, there are health hazards to the operating personnel from the hard to contain vapors of the vaporized solvent. Also, high temperatures are required to keep the solvent in the vapor state. Another disadvantage is that the vaporized solvent technique is expensive and difficult to operate due to the higher temperatures and pressures which are involved. Further, due to the high temperature involved in the vaporized method, plastic articles which have been deflashed tend to run or lose shape after removal from the vapor bath. By the term run, it is meant that small bumps or similar deformations result on the plastic articles after deflashing by the vaporized method due to the high temperatures involved.

It is therefore the primary object of the present invention to provide a new method of deflashing and polishing molded plastic articles wherein use is made of a liquid solvent bath.

More specifically, the object of the present invention is to provide a method of deflashing and polishing molded plastic steering wheels of either the propionate or the butyrate type by use of a liquid solvent bath.

Still other objects and advantages of the present invention will be apparent to those skilled in the art from the following description, reference being made to the accompanying drawings, wherein embodiments of the present invention are clearly shown.

The present invention provides an alternative method to manual removal of mold flash in that the invention removes mold flash from molded plastic articles in a simple, comparatively inexpensive and automated procedure. To avoid manual removal of the mold flash, the discovery has been made that removal of the flash can be carried out by a certain technique of immersion of the molded plastic articles in a liquid solvent bath which arts to readily remove the mold flash and at the same time provides a high polish on the surface of the plastic. It has also been found that the use of the liquid solvent bath method as provided by the invention eliminates the need for manual trimming of the mold flash, and that finishing operations are not necessary either before or after carrying out the method of the invention.

With respect to the disclosure of United States Patent 3,020,661, this disclosure is limited to treatment of molded plastic articles by contacting with a vapor and does not suggest or recognize the highly desirable features resultant of the discovery of the present invention which provides the use of a liquid solvent bath method for the deflashing and polishing of molded plastic articles, thereby avoiding the disadvantages of the vaporized method, and providing a much improved method of deflashing molded plastic articles. In particular, with the present invention the molded plastic articles after being deflashed, do not lose shape or run due to the considerably lower temperatures involved in the use of a liquid bath as opposed to the high temperature vaporized technique of the United States Patent 3,020,661. Also in the present invention, the necessary equipment costs are reduced considerably in comparison to the vaporized technique because no vapor condensation equipment is needed. Still further, health hazards to personnel are eliminated in that with a liquid bath technique there are no problems of a hard-to-contain high temperature vapor. The present invention is carried out through the use of specific solvent mixtures, and specific liquid solvent bath temperatures, all of which will be more clearly understood from the following disclosure of the invention.

Broadly stated, the invention provides a method of deflashing and polishing or glazing molded plastic articles, thereby removing the mold flash formed on the article at the mold parting line, and also enhancing the surface appearance of the plastic articles, which method comprises immersing the molded plastic articles in a liquid solvent bath mixture of chlorinated solvents selected from the group consisting of carbon tetrachloride, methyl chloroform, chloroform, trichloroethylene and perchloroethylene, either alone or in combination with other solvents, at a preselected temperature of the liquid solvent bath, then removing the articles from the liquid solvent bath and drying the article.

To more fully describe the invention, reference is made to the following drawings in which:

FIGURE 1 illustrates a reinforced plastic automobile steering wheel;

FIGURE 2 illustrates a cross sectional view through the steering wheel of FIGURE 1 along the line 2—2 thereof;

FIGURE 3 illustrates a portion of a plastic steering wheel portraying the mold flash attached to said wheel when the wheel is still in an unfinished condition after removal from the mold;

FIGURE 4 illustrates a cross sectional view through the line 4—4 of FIGURE 3 further portraying the thin strips of mold flash which are present on the exterior of an unfinished plastic steering wheel; and FIGURE 5 is a generalized illustration of a liquid solvent bath for immersing an unfinished steering wheel therein for the purpose of deflashing and polishing the steering wheel.

FIGURE 1 shows a conventional plastic automotive steering wheel 1 manufactured for use in today's automobile, and positioned within the plastic wheel is a steel spider or web 2 to give strength and reinforcement to the plastic. The cross sectional view shown in FIGURE 2 illustrates the steel spider 2 which is used for reinforcement of the steering wheel 1, and also, the exterior portion 3 after the mold flash has been removed by the method of the invention. When a steering wheel 1 is manufactured by conventional molding techniques, the steel spider 2 is placed in a mold and the plastic material chosen for the wheel is then molded over the spider. When the molding process is finished, a certain amount of the plastic material has been forced through the mold at the mold parting line resulting in what is termed mold flash 4, left on the exterior portions of the steering wheel. FIGURE 3 shows a portion of the steering wheel 1 of FIGURE 1 in unfinished condition and before the mold flash 4 has been removed from the wheel. FIGURE 4 further illustrates the mold flash 4 in a cross sectional view through FIGURE 3 along the line 4—4, also shown is the interior reinforcing spider 8. In order for the steering wheel 1 to be placed in a finished condition ready for use in an automobile, the mold flash 4 must be removed and the wheel must be polished or glazed such that it presents a very attractive appearance to the eye. In the present invention, removal of the mold flash 4 and polishing of the steering wheel 1 is carried out by immersing the wheel in unfinished condition into a liquid solvent bath generally indicated as 5 within a tank 7 as shown in FIGURE 5. The wheel 1 shown immersed in the liquid solvent mixture 6 is left in the bath for a sufficient period of time to properly deflash and polish the wheel. During the immersion of the wheel, the solvent mixture 6 within the bath 5 is maintained at a preselected temperature suitable for carrying out the deflashing and polishing action, and the composition of the liquid solvent mixture 6 is also maintained at a preselected condition suitable for carrying out the method of the invention.

As above mentioned, the invention provides a method of removing flash formed at the mold parting line on molded plastic articles. At the same time, the method provides a very high glaze and polish on the molded plastic parts. The invention deflashes and polishes these molded plastic articles by use of a liquid solvent, such as for example, carbon tetrachloride, methyl chloroform, chloroform, trichloroethylene, perchloroethylene and mixtures thereof or with other solvents. Best results, however, have been obtained with a solvent mixture of trichloroethylene and perchloroethylene, and for this reason this is the preferred solvent mixture for carrying out the invention. The other materials are somewhat toxic and difficult to control over the required temperature range.

The molded plastic articles which are to be deflashed and polished may be used as received from the mold, and it is not necessary that the articles be trimmed or finished. However, under some extreme circumstances, depending on the condition of the mold and hence the amount of flash on the molded plastic articles, it may be desirable to manually trim some of the excess flash on the molded plastic article when there is a very large excess. The molded plastic articles are then immersed in the liquid solvent bath for a sufficient immersion time period, removed, and then the articles are dried by any suitable technique. For example, the drying can be carried out by placing the molded plastic articles in an air atmosphere at room temperature for approximately ten minutes. Plastic molded articles treated in this fashion show a marked improvement in surface polish, and they are readily deflashed without further trimming being required either before or after use of the liquid solvent bath method. After the solvent is completely evaporated from the molded plastic part, there is no odor and the surface is at least as hard as when originally molded. The molded plastic articles can be handled safely after drying out at room temperature for several minutes after having been removed from the liquid solvent bath.

To more fully describe the invention, an embodiment thereof will now be described with respect to the deflashing and polishing of a molded cellulose acetate butyrate steering wheel. The molded plastic steering wheel was first removed from the mold and preliminarily cleaned of foreign substances such as dust, lint, etc., before presentment to the liquid solvent bath. The plastic steering wheel was then allowed to cool to uniform temperature after removing from the mold, and normally this was about room temperature. Composition of the liquid solvent bath was then adjusted so that the trichloroethylene-perchloroethylene volume ratio was approximately 10:1. The composition of the liquid solvent bath was checked in any suitable manner, for example, by a simple refractive index measurement, a gas chromatographic analysis, or infrared analysis. The temperature of the liquid solvent bath was then adjusted and maintained at approximately 95° F. plus or minus 3°, and the molded plastic steering wheel was then immersed in the liquid solvent bath for approximately ten minutes. After the wheel was immersed in the liquid solvent and withdrawn, the excess solvent was allowed to run off, and the molded plastic steering wheel was allowed to air dry for approximately ten minutes before handling the wheel. The cellulose acetate butyrate steering wheel was completely deflashed and had a high polish or glaze. Further finishing operations were not required.

With regard to the liquid solvent, it was unexpectedly discovered that mixtures of trichloroethylene and perchloroethylene gave excellent results in achieving the objects of the invention, and for this reason, said mixtures are preferred for use in the invention. In determining this, it was found that perchloroethylene by itself did not show enough activity to deflash or polish the molded plastic parts whereas the tricholorethylene by itself was much too active and caused stress crazing. Mixtures of trichloroethylene and perchloroethylene together, however, were suitable and very effective in deflashing the molded plastic parts when volume ratios of trichloroethylene to perchloroethylene used for these mixtures were in the range of about 5:1 to about 20:1. The preferred volume ratio of trichloroethylene to perchloroethylene was found by experiment to be about 10:1, and at this ratio the best results were obtained. Carbon tetrachloride while effective as a solvent did not give comparable results to the use of a solvent mixture of trichloroethylene and perchloroethylene.

Solvent temperatures suitable for carrying out the invention were found to be in the range of about 70° F. to about 200° F. However, above 110° F. there was evidence of stress crazing on some plastic parts while at about room temperature or lower, the deflashing polishing action was too slow. The preferred temperature range is therefore considered to be about 70° F. up to about 110° F. It was found that best results within this preferred temperature range were obtained at a temperature of about 95° F. plus or minus 3°.

With regard to the immersion time period, it should be of sufficient duration to properly deflash and polish the molded plastic article. For example, the plastic articles were suitably deflashed or polished when immersed in the liquid solvent bath for about three to about twenty minutes with the preferred time being about ten minutes dependent on the temperature of the liquid solvent bath and/or the volume ratio of the tricholorethylene to perchloroethylene. In this regard, the length of the immersion is generally of inverse proportion to the temperature of the liquid solvent, and also, the length of the immersion period is generally of inverse proportion to the amount of tricholorethylene present in the liquid solvent.

The foregoing descriptions of the invention and of the specific embodiments of the invention have been given merely by way of example, and it is to be understood that no limitations are intended thereby except as defined by the appended claims.

What is claimed is:

1. A method of deflashing and/or polishing a molded plastic article, said plastic for the article being selected from the group consisting of cellulose acetate butyrate and cellulose acetate propionate, comprising the steps of:
(a) immersing said article in a liquid solvent bath of tricholorethylene and perchloroethylene at a volume ratio of trichloroethylene to perchloroethylene between about 5:1 and about 20:1, said liquid solvent bath being maintained at a temperature of about 70° F. to about 110° F.,
(b) removing said article from the liquid solvent bath, and
(c) drying said article.

2. A method of deflashing and/or polishing a molded plastic article, said plastic for the article being selected from the group consisting of cellulose acetate butyrate and cellulose acetate propionate, comprising the steps of:
(a) immersing said article in a liquid solvent bath of tricholorethylene and perchloroethylene at a volume ratio of trichloroethylene to perchloroethylene of about 10:1, said liquid solvent bath being maintained at a temperature of about 70° F. to about 110° F.,
(b) removing said article from the liquid solvent bath, and
(c) drying said article.

3. A method of deflashing and/or polishing a molded plastic article, said plastic for the article being selected from the group consisting of cellulose acetate butyrate and cellulose acetate propionate, comprising the steps of:
(a) immersing said article in a liquid solvent bath of tricholorethylene and percholorethylene at a volume ratio of trichloroethylene to perchloroethylene of about 10:1, said liquid solvent bath being maintained at a temperature of about 90° F.,
(b) removing said article from the liquid solvent bath, and
(c) drying said article.

4. A method of deflashing and/or polishing a molded plastic article, said plastic for the article being selected from the group consisting of cellulose acetate butyrate and cellulose acetate propionate, comprising the steps of:
(a) immersing said article for an immersion period of about ten minutes in a liquid solvent bath of tricholorethylene and perchloroethylene at a volume ratio of trichloroethylene to perchloroethylene of about 10:1, said liquid solvent bath being maintained at a temperature of about 95° F.,
(b) removing said article from the liquid solvent bath, and
(c) drying said article for about ten minutes in an atmosphere at room temperature.

5. A method of deflashing and/or polishing a molded plastic article, said plastic for the article being selected from the group consisting of cellulose acetate butyrate and cellulose acetate propionate, comprising the steps of:
(a) immersing said article for about ten minutes in a liquid solvent bath of trichloroethylene and perchloroethylene at a volume ratio of trichloroethylene to perchloroethylene between about 5:1 and about 20:1, said liquid solvent bath being maintained at a temperature of about 70° F. to about 110° F.,
(b) removing said article from the liquid solvent bath, and
(c) drying said article.

6. A method of deflashing and/or polishing a molded plastic article, said plastic for the article being selected from the group consisting of cellulose acetate butyrate and cellulose acetate propionate, comprising the steps of:
(a) immersing said article for about ten minutes in a liquid solvent bath of trichloroethylene and perchloroethylene at a volume ratio of tricholorethylene to perchloroethylene of about 10:1, said liquid solvent bath being maintained at a temperature of about 70° F. to about 110° F.,
(b) removing said article from the liquid solvent bath, and
(c) drying said article.

References Cited
UNITED STATES PATENTS

| | | | |
|---|---|---|---|
| 1,658,725 | 2/1928 | Landucci | 264—341 |
| 2,126,714 | 8/1938 | Anderson et al. | 264—341 |
| 2,651,811 | 8/1963 | Coney | 264—341 |
| 3,020,661 | 2/1962 | Miller et al. | 264—341 |
| 3,137,585 | 6/1964 | Salo et al. | 106—190 |
| 3,327,033 | 6/1967 | Koch et al. | 264—341 |

FOREIGN PATENTS 615,179   1/1949   Great Britain.

JULIUS FROME, *Primary Examiner.*

A. H. KOECKERT, *Assistant Examiner.*

U.S. Cl. X.R.

106—190, 198; 117—63, 64, 144.5